United States Patent Office 3,012,950
Patented Dec. 12, 1961

3,012,950
PROCESS FOR POLYMERIZING DIOLEFINS
William S. Anderson, Berkeley, Calif., assignor to Shell Oil Company, a corporation of Delaware
No Drawing. Filed Jan. 29, 1958, Ser. No. 711,784
13 Claims. (Cl. 204—154)

This invention relates to the polymerization of diolefins. More particularly, the invention relates to a process for polymerizing conjugated diolefins using high energy ionizing radiation.

Specifically, the invention provides a new and highly efficient process for preparing high molecular weight polymers of conjugated diolefins, such as butadiene. This process comprises exposing the conjugated diolefin to high energy radiation at a temperature between a $-40°$ C. and $-195°$ C. in an inert atmosphere.

It is an object of the invention to provide a new process for polymerizing conjugated diolefins. It is a further object to provide a process for converting conjugated diolefins into high molecular weight solid polymers. It is a further object to provide a method for preparing high molecular weight polymers from conjugated diolefins without the use of metallic catalysts or peroxide catalysts and special solvents. It is a further object to provide a process for polymerizing diolefins, such as butadiene, to form polymers having a high trans-1,4 structure. These and other objects will be apparent from the following detailed description thereof.

It has now been discovered that these and other objects may be accomplished by the process of the invention which comprises exposing the conjugated diolefin to high energy radiation and particularly to a high energy stream of electrons or protons, at a temperature at between $-40°$ C. and $-195°$ C. in an inert atmosphere. It has been found that by the use of this process one is able to obtain in high yields high molecular weight solid polymers of conjugated diolefins which polymers show promise for use as rubbers and in the preparation of high impact plastic products. When applied to diolefins, such as butadiene, the process forms polymers having unexpectedly high percent of the trans-1,4 structure.

The diolefins to be polymerized by the process of the invention include, among others, the hydrocarbon conjugated diolefins having no greater than 8 carbon atoms, and their halo-substituted derivatives such as butadiene, isoprene, dimethyl butadiene, piperylene, methyl pentadiene, chloroprene and the like. Especially preferred are the conjugated alkodienes containing from 4 to 6 carbon atoms and their chloro-substituted derivatives.

The kinds of radiation suitable for use in the present invention include high energy electrons and photons. Electron beams are suitably produced by electron accelerators such as the Van de Graaff and linear accelerators or by a suitable arrangement of certain isotopes, e.g. strontium 90. High energy photons suitable for use are, for example, X-rays produced by conventional X-ray tubes and electron accelerators and gamma rays which may be produced by decay of radioactive materials such as cobalt 60, cesium 137 and fission products. Although somewhat different effects may be observed in irradiation by heavy particles, the present invention contemplates particularly the use of the high energy protons, alpha particles or neutrons. Proton beams are produced, for example, by accelerators such as Van de Graaff, linear accelerators and cyclotrons. Alpha particles may be produced in the same type of accelerators such as protons or can be produced by decay of radioactive materials, e.g. radium, polonium, uranium and plutonium. Fast neutrons may be obtained within a nuclear reactor or may be obtained as a beam out of a nuclear reactor. Fast neutrons act on hydrocarbons mainly by transferring their energy to protons, which, being charged, induce ionization and excitation as they pass through the monomer mixture.

The devices suitable for producing beams of electrons, protons, alpha-particles, X-rays, fast neutrons and slow neutrons are well known in the art and need not be described here in detail. The preferred process comprises passage of the monomer mixture through a nuclear reactor which may at the same time be employed for power producing purposes or may be utilized exclusively for polymerization. Methods and apparatus for irradiating materials by means of radiation resulting from decay or radioactive substances are also well known. Sources such as rods containing a high concentration of cobalt 60 are used in various arrangements for the irradiation of materials as described, for example, in the pertinent paper by Burton et al., Nucleonics 13 (No. 10), 74 (1955), and references cited therein.

The total dosage needed to effect polymerization will vary with the various monomers. Preferred total dosage varies from $10^5 \times 10^8$ rads, a rad being defined as 100 ergs of ionizing energy per gram of the irradiated mixture.

The dosage rate will also vary considerably. Preferred dosage rate varies from about $10^4$ to $10^{12}$ rads per hour, and still more preferably $10^4$ to $10^7$ rads per hour.

The radiation is conducted at a temperature between a $-40°$ C. and a $-195°$ C. The radiation is preferably accomplished at temperatures ranging from $-40°$ C. to $-100°$ C. These temperatures may be obtained by conventional techniques, such as use of liquid nitrogen, Dry Ice and the like.

The polymerization is preferably carried out in bulk or solvent systems. If solvents were employed they may be inert diluents such as liquid ethane, liquid butane, liquid methyl or ethyl chloride. These diluents are preferably utilized in an amount varying from about .5 to 5 volumes per volume of monomer to be polymerized.

The process is conducted in an inert atmosphere. This is preferably accomplished by use of high vacuum. The molecular oxygen present should preferably be not more than $10^{-1}$ mol percent. It has been found that very small amounts of oxygen accelerates the reaction so it may be desirable in some cases to employ such small amounts of oxygen.

When carrying out the process of the invention by means of radiation with a beam of particles, the reaction mixture is preferably contained in a cell constructed of a suitable material and having a window transparent to the beam. The reaction mixture may be irradiated statically or the mixture may be passed through a conduit having a window transparent to the beam so that it is irradiated in a flow system. In either case, provision is made to remove a small amount of gas, generally mainly hydrogen, which may be formed during the radiation. Table I illustrates suitable windows and cell construction materials to be used with various types of radiation. The whole cell or conduit within the field of radiation may be made of the transparent material.

TABLE I

| 20 Radiation | Cell Material | Window |
| --- | --- | --- |
| X or gamma | 1/4″ Al, 1/10″ S.S. (or any other materials). | none needed. |
| Fast neutrons | Aluminum (or metals of low capture cross section). | Do. |
| Electrons | Any | thin aluminum foil. |

In a special modification of the present process, the reaction mixture is exposed to radiation in a nuclear reactor. A suitable reactor is described in substantial detail in the Fermi et al. Patent U.S. 2,708,656.

One of the preferred means of exposure, due particularly to the relatively low cost of the treatment, comprises suspension of spent nuclear fuel elements (removed from nuclear reactors) in a tank containing the monomers. An ordinary storage tank, properly shielded may be used, and the mixture of monomers should be circulated, so as to effect uniform exposure to the spent fuel elements.

In effecting radiation, the feed mixture may be introduced into the interior of a reactor, as, for example, in a well designed for that purpose or through a cooling tube or tubes.

The mixtures to be treated may be introduced into the reactor or into the path of the fast or high energy beam in a continuous flow through a conduit, or may be placed in a receptacle in the reactor or in the path of the beam and subjected to irradiation while they are substantially static.

It has been found that the rate of polymerization of the dienes using the high energy ionizing radiation can be accelerated by the addition of non-protonic high dielectric constant liquids, such as, for example, nitromethane, nitrobenzene, benzonitrile, acetonitrile and tetrahydrofuran.

The amount of these non-protonic high dielectric constant liquids to be used in the process may vary depending upon the compound selected, the monomer and the rate of polymerization desired. Satisfactory rates are obtained when these compounds are employed in an amount as low as .1 mol percent based on the monomer. Particularly superior rates are obtained when the amount varies from about .5 to 2 mol percent and they are the preferred amounts to be employed.

While the process has been described above as a method for producing homopolymers of the conjugated diolefins, it may also be used to produce copolymers of the conjugated diolefins as well as copolymers of the diolefins with other ethylenically unsaturated monomers, and particularly those having a terminal CH=C< group, such as isobutylene, ethylene, butene, propylene, styrene, alpha-methylstyrene, vinyl ethyl ether, vinyl butyl ether and the like, and mixtures thereof. In making such copolymers it is preferred to keep the amount of the conjugated diolefin below about 25% by weight, and preferably between .5% to 20% by weight.

The polymers and copolymers prepared by the process of the invention may be utilized for a gerat many important industrial applications. The polymers may be used, for example, in the preparation of molded rubber articles, such as tires, belts, tubes and the like or may be added alone or with other polymeric materials to known rubber compositions to improve specific properties, such as impact resistance. The polymers of the invention may also be used in the preparation of impregnating and coating compositions or may be combined with asphalts, tars and the like to form surfacing compositions for roads and walkways.

In forming rubber articles from the homopolymers and copolymers produced by the process of the invention, it is preferred to compound the polymer with the necessary ingredients, such as, for example tackifiers, plasticizers, stabilizers, vulcanizing agents, oils, carbon black and the like, and then heating to effect vulcanization. Preferred vulcanizing agents include, among others, sulfur, sulfur chloride, sulfur thiocyanate, thiuram polysulfides and other organic polysulfides. These agents are preferably used in amounts varying from about 0.1 part to 10 parts per 100 parts of rubber. Vulcanization temperatures preferably range from about 100° C to about 175° C. Preferred temperatures range from about 125° C. to 175° C. for a period of 15 to 60 minutes.

To illustrate the manner in which the invention may be carried out, the following examples are given. It is to be understood, however, that the examples are for the purpose of illustration, and the invention is not to be regarded as limited to any of the specific conditions cited therein.

Example I

This example illustrates the preparation of polybutadiene using an electron beam in a Van de Graaff accelerator.

Butadiene monomer was introduced into a reaction vessel and the temperature of the vessel reduced to $-100°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product was a white solid having a molecular weight of approximately 100,000.

100 parts of the above polymer was compounded with 2 parts phenyl-beta-naphthylamine, 5 parts zinc oxide, 3 parts stearic acid, 50 parts high abrasion furnace black, 1.2 parts of N-cyclohexyl-2-benzothiazole-sulfenamide and 0.8 part of sulfur, and the product cured for 20 minutes at 135° C. The resulting product was a hard rubber sheet that could be used in the formation of belts, tubes and the like.

Example II

Example I was repeated with the exception that 1 mol percent of nitromethane was included in the reaction zone. In this case, the solid polymer was obtained in a much shorter time than in the absence of the nitromethane.

Example III

This example illustrates the preparation of polyisoprene using an electron beam in a Van de Graaff accelerator.

Isoprene was introduced into a reaction vessel and the temperature of the vessel reduced to $-100°$ C. This mixture was then irradiated in an electron beam in a Van de Graaff accelerator to a radiated dosage of $5 \times 10^5$ rads. This was accomplished by using a dosage rate of $10^6$ rads per hour for 0.5 hour. The resulting product was a white solid having a molecular weight of approximately 200,000.

100 parts of the above polymer was compounded with 2 parts phenyl-beta-naphthylamine, 5 parts zinc oxide, 3 parts stearic acid, 50 parts high abrasion furnace black, 1.2 parts of N-cyclohexyl-2-benzothiazole-sulfenamide and 0.8 part of sulfur, and the product cured for 20 minutes at 135° C. The resulting product was a hard rubber sheet that could be used in the formation of belts, tubes and the like.

Example IV

Examples I to III are repeated with the exception that the monomer was irradiated by exposure to spent uranium reactor fuel elements. In this case also a white solid polymer is obtained.

Example V

Examples I to IV are repeated with the exception that the temperature is changed to a $-180°$ C. A white solid high molecular weight polymer having properties similar to the polymer produced in Examples I and II are obtained.

Example VI

This example illustrates the preparation of polypiperylene using an electron beam in a Van de Graaff accelerator.

Piperylene was introduced into a reaction vessel and the temperature of the vessel reduced to $-100°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product was a white solid having a molecular weight of approximately 500,000.

Example VII

This example illustrates the preparation of a copolymer of butadiene and isobutylene using an electron beam in a Van de Graaff accelerator.

A mixture of parts butadiene and 95 parts isobutylene was introduced into a reaction vessel and the temperature of the vessel reduced to $-100°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product is a white solid polymer.

100 parts of the above polymer was compounded with 2 parts phenyl-beta-naphthylamine, 5 parts zinc oxide, 3 parts stearic acid, 50 parts high abrasion furnace black, 1.2 parts of N-cyclohexyl-2-benzothiazole-sulfenamide and 0.8 parts of sulfur, and the product cured for 20 minutes at 135° C. The resulting product was a hard rubber sheet that could be used in the formation of belts, tubes and the like.

*Example VIII*

This example illustrates the preparation of a copolymer of isoprene and isobutylene using an electron beam in a Van de Graaff accelerator.

A mixture of 5 parts of isoprene and 95 parts isobutylene was introduced into a reaction vessel and the temperature of the vessel reduced to $-100°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product is a white solid polymer.

*Example IX*

This example illustrates the preparation of a copolymer of piperylene and isobutylene using an electron beam in a Van de Graaff accelerator.

A mixture of 5 parts of piperylene and 95 parts of isobutylene was introduced into a reaction vessel and the temperature of the vessel reduced to $-80°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product was a white solid polymer. The copolymer has a higher double bond content than the isoprene and butadiene copolymers shown in the preceding examples.

*Example X*

This example illustrates the preparation of a copolymer of butadiene and alpha-methylstyrene using an electron beam in a Van de Graaff accelerator.

A mixture of 10 parts of butadiene and 90 parts of alpha-methylstyrene was introduced into a reaction vessel and the temperature of the vessel reduced to $-100°$ C. This mixture was then irradiated in an electron beam in a Van de Graaff accelerator to a radiation dosage of $5 \times 10^5$ rads. This was accomplished by using a dosage rate of $10^6$ rads per hour for 0.5 hour. The resulting product was a white solid polymer.

*Example XI*

Examples VI to X are repeated with the exception that 1 mol percent of nitromethane is included with the monomer. In this case, the solid polymers are obtained in a shorter period of time.

*Example XII*

Examples VI to X are repeated with the exception that the polymerization is accomplished at a temperature of $-140°$ C. The same type of white polymer was obtained as when the processes were conducted at the higher temperatures.

The molecular weights referred to herein are determined by intrinsic viscosity measurements in toluene. The products preferably have molecular weights varying from about 50,000 to 1,500,000.

I claim as my invention:

1. A process for polymerizing conjugated diolefins containing up to 8 carbon atoms which comprises exposing continuously over a period of at least 30 minutes the monomer to a total dosage of at least $10^5$ rads of high energy ionizing radiation at a temperature between $-40°$ C. and $-195°$ C. and in an atmosphere which contains not more than $10^{-1}$ mol percent of molecular oxygen, the polymerization being conducted in the presence of a non-protonic high dielectric constant liquid selected from the group consisting of nitromethane, nitrobenzene, benzonitrile, acetonitrile and tetrahydrofuran.

2. A process for preparing copolymers which comprises exposing continuously over a period of at least 30 minutes a mixture containing up to 25 percent by weight of a conjugated diolefin containing up to 8 carbon atoms and the remainder being a dissimilar monomer containing a single $CH_2=C<$ group to high energy ionizing radiation of $10^5 \times 10^8$ rads at a temperature between $-100°$ C. and $-195°$ C. in an inert atmosphere, the polymerization being conducted in the presence of a non-protonic high dielectric constant liquid selected from the group consisting of nitromethane, nitrobenzene, benzonitrile, acetonitrile and tetrahydrofuran.

3. A process for polymerizing butadiene to form molecular weight products which comprises exposing continuously over a period of at least 30 minutes the butadiene to $10^5$ to $10^8$ rads of high energy ionizing radiation at a temperature between $-100°$ C. and $-180°$ C. in an inert atmosphere, the polymerization being conducted in the presence of a non-protonic high dielectric constant liquid selected from the group consisting of nitromethane, nitrobenzene, benzonitrile, acetonitrile and tetrahydrofuran.

4. A process as in claim 1 wherein the radiation is employed in an amount varying from $10^5$ to $10^8$ rads.

5. A process as in claim 1 wherein the radiation is conducted at a temperature between $-100°$ C. and $-180°$ C.

6. A process as in claim 1 wherein the conjugated diolefin is butadiene.

7. A process as in claim 1 wherein the conjugated diolefin is isoprene.

8. A process as in claim 1 wherein the conjugated diolefin is piperylene.

9. A process as in claim 2 wherein the mixture of monomers is piperylene and isobutylene.

10. A process as in claim 2 wherein the mixture of monomers is butadiene and isobutylene.

11. A process as in claim 2 wherein the mixture of monomers is butadiene and alpha-methylstyrene.

12. A process as in claim 2 wherein the mixture of monomers is isoprene and isobutylene.

13. A process for preparing a polymer of a conjugated diolefin containing up to 8 carbon atoms, said polymer having a molecular weight between 50,000 and 1,500,000, which comprises exposing continuously over a period of at least 30 minutes the said diolefin in the presence of a non-protonic high dielectric constant liquid selected from the group consisting of nitromethane, nitrobenzene, benzonitrile, acetonitrile and tetrahydrofuran to a total dosage of at least $10^5$ rads of high energy ionizing radiation at a temperature between $-100°$ C. to $-195°$ C. and in an atmosphere which contains not more than $10^{-1}$ mols of molecular oxygen.

References Cited in the file of this patent
UNITED STATES PATENTS 2,996,441     Nelson et al.            Aug. 15, 1961

FOREIGN PATENTS 665,262     Great Britain            Jan. 23, 1952

OTHER REFERENCES

Sun: Modern Plastics, vol. 32, No. 1, September 1954, pages 141–144, 146, 148, 150, 229–233, 236–237.